Figure 1:
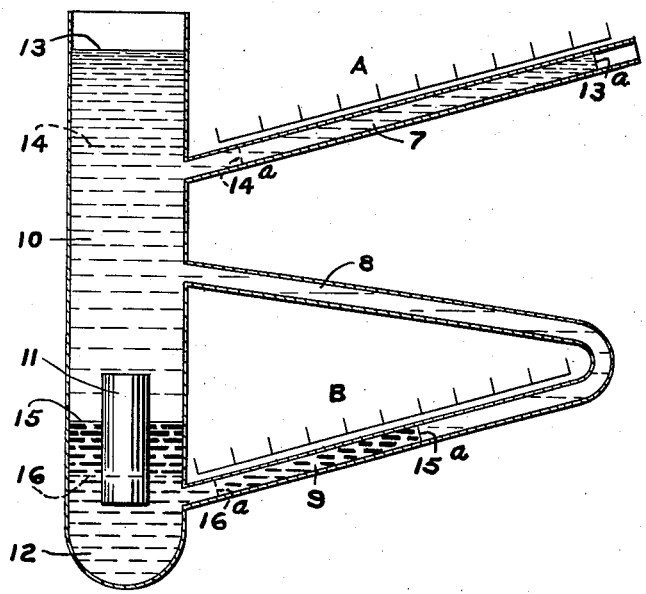

INVENTOR.
SAMUEL LIPSON
BY HYMAN ROSENTHAL
ANTHONY SAIA

ATTORNEYS

United States Patent Office 2,889,703
Patented June 9, 1959

2,889,703
APPARATUS FOR MEASURING THE DENSITY OF A SOLID

Samuel Lipson, Hyman Rosenthal, and Anthony Saia, Philadelphia, Pa., assignors to the United States of America as represented by the Secretary of the Army Application February 14, 1956, Serial No. 565,513

2 Claims. (Cl. 73—32)

(Granted under Title 35, U.S. Code (1952), sec. 266)

The invention described herein may be manufactured and used by or for the Government for governmental purposes without payment of any royalty thereon.

This invention relates to a simple and easy apparatus for determining density, especially the density of lighter metals such as aluminum and magnesium. An object is to reduce the time heretofore required in foundries for determining the density of samples of such metals.

For a great many years, metallurgists have known that hydrogen is readily soluble in molten aluminum but is not nearly so soluble in the same metal in a solid state. Where an objectionable quantity of this gas is present in the crucible of the metal, then during cooling and solidifying the gas evolves from the cooling metal forming many small gas pockets which prevent the castings from possessing the strength they otherwise should have. To minimize this danger it has been the practice in aluminum foundries to pour a test sample in a suitable cup, then subject the sample to a partial vacuum during cooling in order to increase the size of the gas bubbles so that their presence is more noticeable in the test sample. The density of the sample may then be determined with the aid of a sensitive balance. Such density determination would result in delay in the use of the crucible content of perhaps 5 to 10 minutes. More generally a qualitative estimate is made of the melt quality. This estimate is based on the appearance of the test specimen and is necessary because of the time consuming nature of the density measurement. Where the gas content of the metal is shown to be too high, the amount of gas in the molten bath is reduced in a customary manner after which possibly another test sample may be needed to be sure the gas content is low enough. The qualitative evaluation of the test sample cannot discriminate between a gas-free melt and one that contains a small but deleterious volume of gas. The use of a density measurement of the sample can provide the desired sensitivity, but due to the time required for the test, such measurements are not made.

According to this invention an apparatus for such density measurement has been discovered which requires possibly only 10 percent or less of the time previously needed for the same measurement. Specifically, the same test specimen is subjected to a partial vacuum as before to expand its gas content. The solid specimen at or near room temperature is then immersed in a tube containing two immiscible liquids, one of less density than the metal in the test cup and the other liquid of greater density than such metal. The sum of the weights of the two liquids displaced by the test cup and its contents is an indication of the weight of the metal buoyed up by them, and this weight divided by its volume represents the density.

Figure 2:
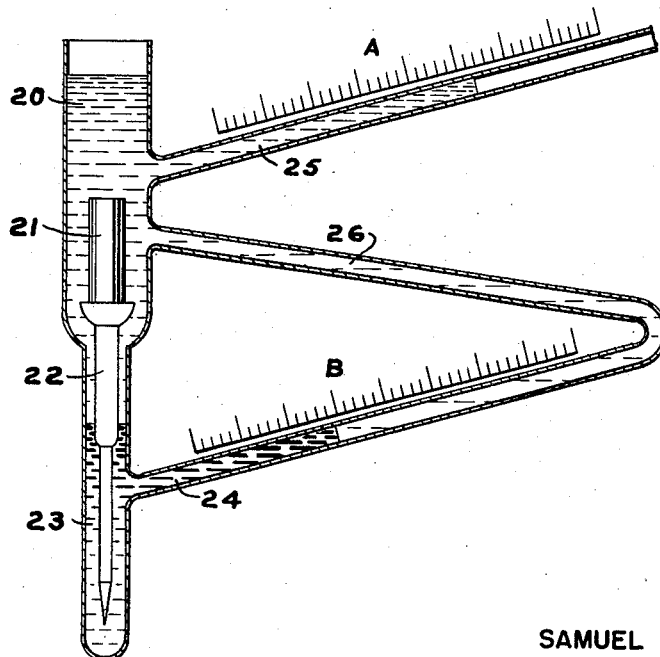

Fig. 1 shows one embodiment of this invention and Fig. 2 another embodiment in which the test specimen does not have to contact the heavier liquid.

Referring to the drawing, a liquid 10 of less density than a solid 11 is placed in the illustrated containing vessel with the liquid 12 of greater density than specimen 11. Upwardly inclined arms 7 and 9 are provided with scales A and B for reading the height to which the liquid in each tube is caused to rise by the immersion of the specimen 11. The tube 9 has its upper end portion connected with the liquid-containing vessel by an oppositely inclined tube 8. When the specimen whose density is to be determined is immersed, it will come to rest partially within the lighter liquid and partially within the heavier liquid, as illustrated. The liquid level 13 shows the height to which the lighter liquid has risen after immersion of the solid from its initial height 14 before the specimen was immersed. The numeral 13a shows the liquid level height in the tube 7 corresponding to the height 13. 14a is the level of the liquid in tube 7 before immersion of the solid test specimen. The liquid levels 15 and 15a show the height to which the heavier liquid has risen as a result of the immersion of the test specimen, and the levels 16 and 16a indicate where the heavier liquid was originally. In Fig. 2 is an apparatus embodying the principles of the apparatus of Fig. 1 except that the test specimen 21 is not immersed in the heavier liquid but instead rests upon a support 22 which is immersed in the heavier liquid 23. The lighter liquid 20 rises in the tube 25 for measurement by the scale A, as was done in Fig. 1, and the heavier liquid rises in the tube 24 to an extent indicated by the scale B. The density of the sample must be intermediate that of the light and heavy liquids.

An example of two liquids of suitable density is mercury and water. Another example is mercury and ethyl alcohol. Depending upon the solid material whose density is being measured, any available liquid that is of greater density than the solid may be used as well as any available liquid whose density is less than that of the solid, although, of course, these liquids should be inert to the presence of the solid and to each other. The level of the heavy liquid changes to correspond with the displacement of this liquid. This change in levels of the heavier liquid is indicated by the lower inclined arm. The scales on both arms can be calibrated to read volumetric displacement caused by insertion of the test specimen. The level changes occurring in these arms can then be used to calculate the density of the sample under the familiar definition of density as it is mass per unit volume. Assuming A to indicate the volumetric displacement read on the upper scale which represents the total volume of the test specimen, B the volumetric displacement read on the lower scale i.e., the volumetric displacement of the heavier liquid, K the density of the heavier liquid and $K_1$ the density of the lighter liquid. D is the density of the test specimen, then $$D = \frac{BK + (A-B)K_1}{A}$$

The expression $BK + (A-B)K_1$ is equal to the weight of the specimen and A is equal to the volume. For a given pair of liquids, the expression $K - K_1$ may be combined algebraically as $K_0$ when $$D = \frac{BK_0}{A} + K_1$$

This last equation for density may be used to design a nomograph so that the arithmetical calculation is reduced. In practice, it may be desirable to use an arbitrary scale graduated with linear divisions. Such is possible if it is assumed that the tubes are straight, of constant bore, and that the level of the instrument is not altered in the test.

In the embodiment illustrated in Fig. 2 the arms were of glass having a bore diameter of 2 mm. Using a 1 inch diameter specimen 21, 2 inches long, of aluminum in a containing vessel 1¼ inches in diameter with ethyl alcohol and mercury as the liquids, an approximate change of 180 mm. for the upper arm and 30 mm. for the lower would be indicated. In an instrument having the reduced diameter shown in Fig. 2, the linear changes for the same specimen can be adjusted to be of equal order of magnitude, 180 mm. in both arms should it be desirable, by diminishing the lower cylinder to have a cross section area of approximately ⅙ of that of the upper cylinder when the same liquids are used, or the angles of the arms could be varied so that the lower inclined tube is at an angle whose cotangent with the horizontal is approximately six times as great as the cotangent of the angle of the upper tube in Fig. 1. This latter solution is not as satisfactory as is the one illustrated in Fig. 2 where the lower cylinder is of different diameter from the upper.

Among the advantages of this invention may be mentioned the great saving of time as compared with prior art processes with density determination using a sensitive balance as heretofore has been customary.

The apparatus of this invention can avoid the contact of the test specimen with the heavier liquid if desired, in which case, when the liquid is mercury, it is often difficult to obtain a satisfactory surface to surface contact due to the high surface tension of mercury. In Fig. 2 the test specimen does not have to be small enough to enter the mercury tube. The specimen is readily accessible for immersion and removal from the apparatus. The addition of a low energy vibrator is desirable to overcome whatever frictional forces prevent equilibrium and a signal buzzer has been used for this purpose. The pedestal or support 22 in Fig. 2 will not affect the density measurement of the specimen. Experience has shown that this apparatus gives readings in which a maximum variation will be less than ±0.02 gram per cu. cm. From the foregoing formula for density it will be seen that the ratio of liquid displaced in one tube to that of the other liquid displaced in the other tube is the important feature. For convenience the tubes A and B may be of the same size as shown in the drawing.

We claim:

1. An apparatus whereby the density of a solid may be determined with expedition and facility, comprising an elongated upright container for two immiscible liquids of different densities, each of which is adapted to be displaced on immersion therein of a solid, a first tube rising at an acute angle from a lower portion of said container below where an interface of the liquids should be and into which some of the heavier of the two liquids should be and into which that heavier liquid is adapted to be displaced on partial immersion of a solid therein of less density than the heavier liquid, a second tube connecting an upper end portion of the first mentioned tube with said container above where an interface of the liquids should be, said first tube having a scale along said first tube whereby the volume of heavier liquid displaced by such a solid may be indicated, and a third tube rising from well above where an interface of the liquids should be and at an acute angle from an upper portion of said container and having a scale along said third tube whereby the volume of the lighter liquid displaced on immersion of such a solid may be read as the lighter liquid rises in said container and second tube, whereby both the weight and volume of the test specimen may be obtained for determination of density.

2. Apparatus according to claim 1 in which the second tube is connected with the container below the third tube.

References Cited in the file of this patent

UNITED STATES PATENTS

| | | |
|---|---|---|
| 1,524,928 | Hardel et al. | Feb. 3, 1925 |
| 2,706,908 | MacRoberts | Apr. 26, 1955 |

FOREIGN PATENTS

| | | |
|---|---|---|
| 158,018 | Great Britain | Feb. 3, 1921 |
| 320,943 | Italy | Sept. 15, 1934 |